United States Patent
Arques et al.

(10) Patent No.: US 8,594,490 B2
(45) Date of Patent: Nov. 26, 2013

(54) SYSTEM AND METHOD FOR OVERTIME VIEWING

(75) Inventors: Xavier Arques, Paris (FR); Narcisse Duarte De Freitas, Saint Maurice-Montcouronne (FR); Jean Baptiste Garreau, Le Kremlin-Bicetre (FR)

(73) Assignee: Cisco Technology, Inc., San Jose, CA (US)

( * ) Notice: Subject to any disclaimer, the term of this patent is extended or adjusted under 35 U.S.C. 154(b) by 352 days.

(21) Appl. No.: 12/735,335

(22) PCT Filed: Jun. 12, 2008

(86) PCT No.: PCT/IB2008/052322
§ 371 (c)(1),
(2), (4) Date: Aug. 16, 2010

(87) PCT Pub. No.: WO2009/087496
PCT Pub. Date: Jul. 16, 2009

(65) Prior Publication Data
US 2010/0303441 A1    Dec. 2, 2010

Related U.S. Application Data

(60) Provisional application No. 61/010,513, filed on Jan. 9, 2008.

(51) Int. Cl.
*H04N 5/76* (2006.01)
(52) U.S. Cl.
USPC .......................................... 386/296; 386/298
(58) Field of Classification Search
None
See application file for complete search history.

(56) References Cited

U.S. PATENT DOCUMENTS

| 6,760,538 | B1 | 7/2004 | Bumgardner et al. | |
| 2002/0144274 | A1* | 10/2002 | Gaviot et al. | 725/86 |
| 2005/0251437 | A1* | 11/2005 | Meuleman | 705/10 |

(Continued)

FOREIGN PATENT DOCUMENTS

| EP | 1 162 839 A2 | 12/2001 |
| JP | 2006166461 A | 6/2006 |

(Continued)

OTHER PUBLICATIONS

Feb. 18, 2011 Office Communication in connection with prosecution of EP 08 763 310.3.

(Continued)

*Primary Examiner* — Huy T Nguyen
(74) *Attorney, Agent, or Firm* — Husch Blackwell LLP

(57) ABSTRACT

A method and system for adding overtime to a video recording are described. The method and system include providing a personal video recorder (PVR) operative to record a video stream, providing a multimedia content item on the video stream, providing metadata accessible to the PVR, the metadata being associated with the multimedia content item and including at least a first metadata item and a second metadata item, recording the multimedia content item at the PVR for a first amount of time, the first amount of time being indicated by the first metadata item, continuing to record the multimedia content item after the end of the first amount of time, for a second amount of time based, at least in part, on at least one parameter in the second metadata item. Related methods and apparatus are also described.

12 Claims, 5 Drawing Sheets

(56) References Cited

U.S. PATENT DOCUMENTS

| | | | |
|---|---|---|---|
| 2006/0064721 A1 | 3/2006 | Del Val et al. | |
| 2006/0206912 A1* | 9/2006 | Klarfeld et al. | 725/40 |
| 2006/0230417 A1* | 10/2006 | Van Horck | 725/45 |
| 2007/0172196 A1* | 7/2007 | Kusunoki et al. | 386/83 |
| 2008/0285943 A1* | 11/2008 | Wang et al. | 386/83 |
| 2011/0126235 A1* | 5/2011 | White et al. | 725/44 |

FOREIGN PATENT DOCUMENTS

| | | |
|---|---|---|
| WO | WO 01/47249 A2 | 6/2001 |
| WO | WO 03/034426 A1 | 4/2003 |
| WO | WO 2006/018825 A2 | 2/2006 |
| WO | WO 2006/131746 A2 | 12/2006 |
| WO | WO 2007/057852 A2 | 5/2007 |
| WO | WO 2007/080564 A1 | 7/2007 |
| WO | WO 2007/136216 A2 | 11/2007 |

OTHER PUBLICATIONS

"Digital Video Broadcasting (DVB) Specification for Service Information (SI) in DVB Systems" ETSI EN 300 468 V1.5.1 (European Telecommunications Standards Institute, May 2003).

Jan. 4, 2013 Office Communication in connection with prosecution of EP 08 763 310.3.(4 pgs).

Jan. 4, 2013 Office Communication in connection with prosecution of EP 08 763 310.3(17 pgs).

Aug. 20, 2012 Office Communication in connection with prosecution of AU 2008 346 218.

Aug. 22, 2012 Office Communication in connection with prosecution of EP 08 763 310.3.

* cited by examiner

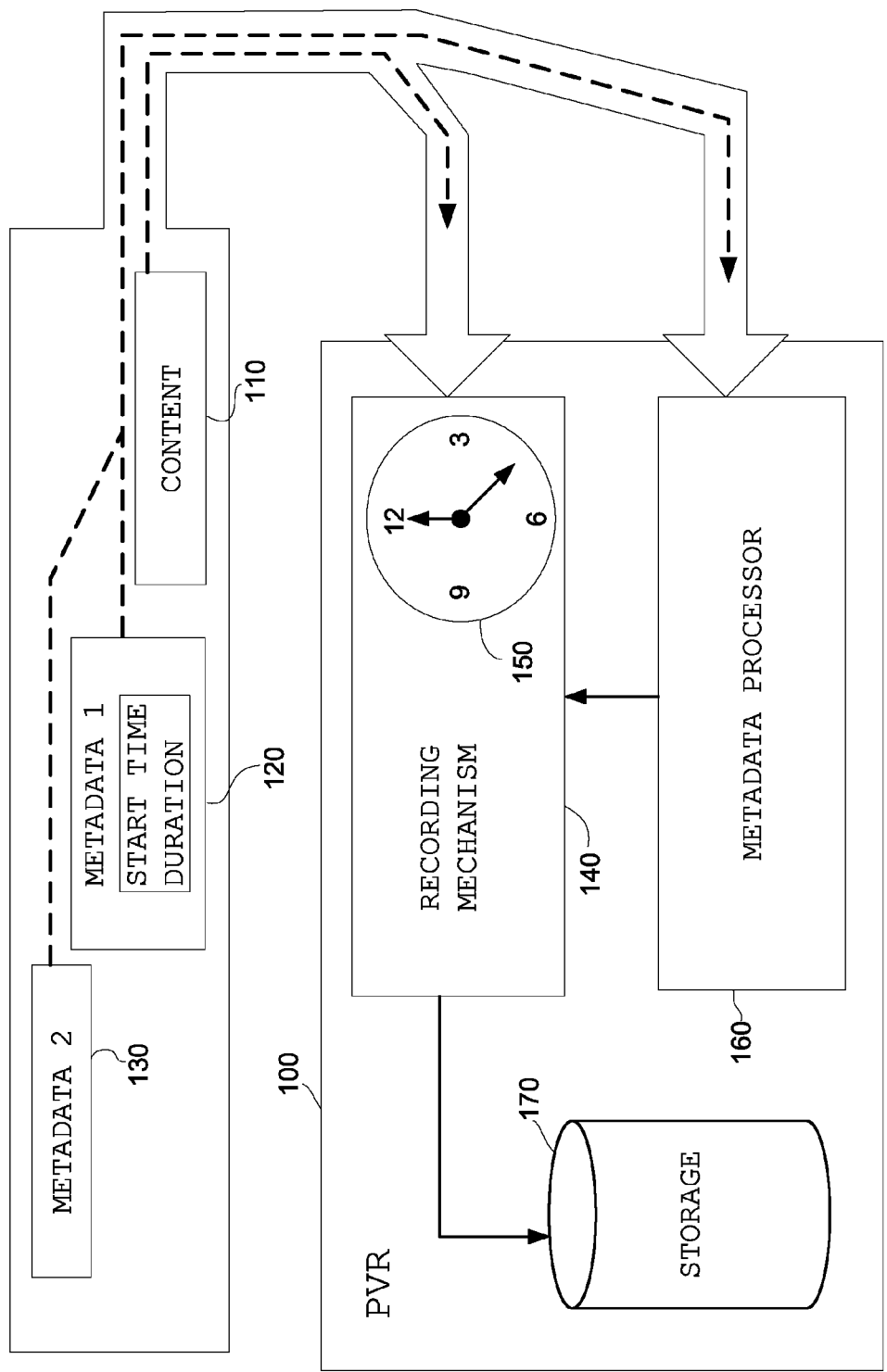

SYSTEM AND METHOD FOR OVERTIME VIEWING

The present application is a 35 USC §371 application of PCT/IB2008/052322, of NDS Ltd., filed on 12 Jun. 2008 and entitled "System and Method For Overtime Viewing", which was published in the English language with International Publication Number WO 2009/087496, and which claims the benefit of priority from U.S. Provisional Patent Application 61/010,513, filed 9 Jan. 2008.

BACKGROUND OF THE INVENTION

ETSI EN 300 468, V1.5.1 (2003-05), *Digital Video Broadcasting (DVB); Specification for Service Information (SI) in DVB systems*, which specifies DVB Service Information (SI) metadata tables for use in digital broadcast. ETSI EN 300 468, V1.5.1 is hereby incorporated herein by reference.

The following published patents and patent applications are also believed to reflect the present state of the art:
WO 2007/080564 of NDS Ltd.;
WO 2007/057852 of Koninklije Philips Electronics N.V.;
WO 2006/018825 of NDS Ltd.;
WO 03/034426 of Koninklije Philips Electronics N.V.;
WO 01/47249 of Tivo, Inc.; and
U.S. Pat. No. 6,760,538 to Baumgardner, et al.

SUMMARY OF THE INVENTION

There is thus provided in accordance with an embodiment of the present invention a method for adding overtime to a video recording, the method including providing a personal video recorder (PVR) operative to record a video stream, providing a multimedia content item on the video stream, providing metadata accessible to the PVR, the metadata being associated with the multimedia content item and including at least a first metadata item and a second metadata item, recording the multimedia content item at the PVR for a first amount of time, the first amount of time being indicated by the first metadata item, continuing to record the multimedia content item after the end of the first amount of time, for a second amount of time based, at least in part, on at least one parameter in the second metadata item.

Further in accordance with an embodiment of the present invention the second amount of time is based, at least in part, on a user input from at least one of an end user and a broadcaster.

Still further in accordance with an embodiment of the present invention the multimedia content item includes at least one video component.

Additionally in accordance with an embodiment of the present invention the multimedia content item includes at least one audio component.

Moreover in accordance with an embodiment of the present invention the multimedia content item includes at least one subtitle component.

Further in accordance with an embodiment of the present invention the multimedia content item includes at least one video component.

Still further in accordance with an embodiment of the present invention the first metadata item is associated with the multimedia content item.

Additionally in accordance with an embodiment of the present invention the first metadata item includes DVB service information (SI) metadata.

Moreover in accordance with an embodiment of the present invention the first metadata item includes an EIT table of the DVB SI metadata.

Further in accordance with an embodiment of the present invention the first metadata item includes at least one of the DVB SI EIT start time field, and duration field.

Still further in accordance with an embodiment of the present invention the first metadata item includes a table included in a proprietary service information scheme.

Additionally in accordance with an embodiment of the present invention the table includes a service information table from one of XSI and XSI-2.

Moreover in accordance with an embodiment of the present invention the second metadata item is associated with the multimedia content item.

Further in accordance with an embodiment of the present invention the second metadata item includes DVB service information (SI) metadata.

Still further in accordance with an embodiment of the present invention the second metadata item includes an EIT table of the DVB SI metadata.

Additionally in accordance with an embodiment of the present invention the second metadata item includes the DVB SI EIT content descriptor.

Moreover in accordance with an embodiment of the present invention the second metadata item includes at least one of the DVB SI EIT content descriptor content_nibbles_level_1, content_nibbles_level_2, and at least one user_nibble.

Further in accordance with an embodiment of the present invention the second metadata item includes a table included in a proprietary service information scheme.

Still further in accordance with an embodiment of the present invention the table includes a table from one of XSI and XSI-2.

Additionally in accordance with an embodiment of the present invention the second metadata item includes a private descriptor.

Moreover in accordance with an embodiment of the present invention the private descriptor includes a private descriptor in an EIT table of the DVB SI metadata.

Further in accordance with an embodiment of the present invention the private descriptor includes a private descriptor in a table included in a proprietary service information scheme.

Still further in accordance with an embodiment of the present invention the table includes a table from one of XSI and XSI-2.

Additionally in accordance with an embodiment of the present invention the second metadata item is associated with a service on which the multimedia content item is associated.

Moreover in accordance with an embodiment of the present invention the second metadata item includes DVB service information (SI) metadata.

Further in accordance with an embodiment of the present invention the second metadata item includes an EIT table of the DVB SI metadata.

Still further in accordance with an embodiment of the present invention the second metadata item includes the DVB SI SDT service_id field.

Additionally in accordance with an embodiment of the present invention the second metadata item includes a table included in a proprietary service information scheme.

Moreover in accordance with an embodiment of the present invention the table includes a table from one of XSI and XSI-2.

There is also provided in accordance with a another preferred embodiment of the present invention a system for adding overtime to a video recording, the system including a personal video recorder (PVR) operative to record a video stream, a multimedia content item on the video stream, metadata accessible to the PVR, the metadata being associated with the multimedia content item and including at least a first metadata item and a second metadata item, a multimedia content recorder included in the PVR operative to record the multimedia content item for a first amount of time, the first amount of time being indicated by the first metadata item, the multimedia content recorder being further operative to continue to record the multimedia content item after the end of the first amount of time, for a second amount of time based, at least in part, on at least one parameter in the second metadata item.

BRIEF DESCRIPTION OF THE DRAWINGS

The present invention will be understood and appreciated more fully from the following detailed description, taken in conjunction with the drawings in which:

FIG. 2 is a simplified block diagram illustration of a PVR in which the system of FIGS. 1A and 1B may be implemented;

The following Appendices may be helpful in understanding certain preferred embodiments of the present invention:

Appendix A comprises the table of Content_nibble_level_1 and Content_nibble_level_2 assignments provided in ETSI EN 300 468, V1.5.1; and Appendix B comprises an exemplary proprietary Content_nibble_level_1 and Content_nibble_level_2 and User_nibbles assignment, as may be used by a typical broadcaster.

DETAILED DESCRIPTION OF AN EMBODIMENT

Figure 1B:
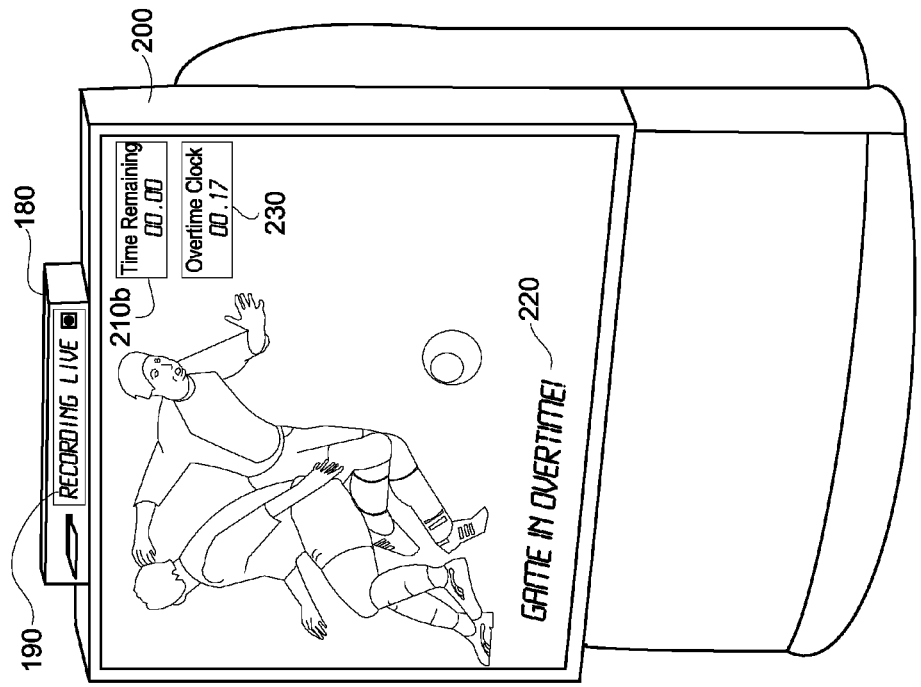
FIGS. 1A and 1B are simplified pictorial illustrations of a system for adding overtime to a video recording constructed and operative in accordance with an embodiment of the present invention.
Figure 1A:
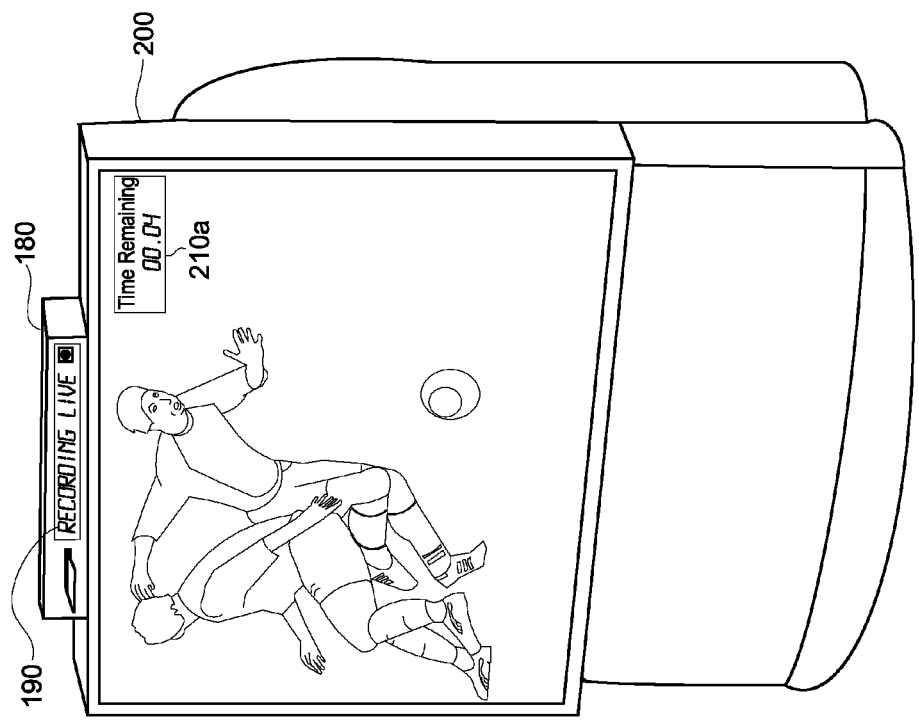

Reference is now made to FIGS. 1A and 1B, which are simplified pictorial illustrations of a system for adding overtime to a video recording constructed and operative in accordance with an embodiment of the present invention.

In order to explain the elements comprising the system of FIGS. 1A and 1B, reference is now additionally made to FIG. 2. FIG. 2 is a simplified block diagram illustration of a PVR in which the system of FIGS. 1A and 1B may be implemented. The system of FIGS. 1A and 1B comprises a personal video recorder (PVR, also referred to in the art as a digital video recorder (DVR)) 100. The PVR 100 receives multimedia content 110 and content associated metadata. The content associated metadata comprises a first metadata item 120 and a second metadata item 130. The PVR 100 comprises a recording mechanism 140. The recording mechanism 140 comprises a timer 150, the timer being operative to control, when multimedia content is recorded for a fixed duration, when the fixed duration terminates. The PVR 100 also comprises a metadata processor 160, operative to process the content associated metadata received at the PVR 100. The PVR 100 records the multimedia content to content storage 170.

Those skilled in the art will appreciate that multimedia content 110 typically comprises at least one of: a plurality of available video components, a plurality available audio components, a plurality of available subtitle components, and a plurality available data components. For example and without limiting the generality of the foregoing, typical multimedia content may comprise one video component; two audio components, one in French and one in English; and subtitles in German, That and Finnish.

Returning now to the discussion of FIGS. 1A and 1B, the operation of system of FIGS. 1A and 1B is now discussed. Commercially available PVRs typically offer multiple methods of recording content. Specifically, a user of the PVR 100 may opt to record an ongoing or a forthcoming program using one of a plurality of different types of recording. For example and without limiting the generality of the foregoing, the following different types of recording are typically available:

instant recording;
manual recording; and
event recording.

Instant recording is typically used to record a viewed program, through a procedure which is typically faster than normal event recording (see below) or manual recording (see below). The user of the PVR 100 can request that the program he is presently watching is recorded using a procedure faster than normal event recording or manual recording procedures, and the PVR 100 starts recording from the instant the user requests the recording. Instant recording is much faster because it is typically a one-click operation (only a Record key is pressed).

Manual recording is typically used to record a channel for a given time-slice, independently of the scheduled events. Manual recording requires setting parameters such as channel, start time, end-time, and so forth. One advantage of manual recording is that it is possible to configure the PVR 100 for periodic recordings (daily, weekly . . . ). The user of the PVR 100 is able to configure the PVR 100 to record a channel during a given time-slice by manually entering the scheduling parameters in any application that offers manual recording.

Event recording is typically used to record a program event presented in an EPG-like application. Event recording automatically schedules the PVR 100 to record the selected event. Event recording enables the user of the PVR 100 to record the desired program without entering parameters such as start time, end-time and channel. Additionally, in event recording, editorial data (such as title, summary, available audio/subtitle options) related to the event can be consulted afterwards Event recording refers to an explicit configuration whereby the PVR will automatically record a certain content item of a given event type. For example and without limiting the generality of the foregoing, a user may program the PVR to automatically record:

every football game broadcast on Sundays;
every basketball game broadcast on a particular channel;
every hockey game; and
a movie broadcast at nine o'clock on Wednesday night on a favorite movie channel.

In a typical digital broadcast system, DVB System Information (SI), as specified in ETSI EN 300 468 comprises an Event Information Table (EIT). Other, non-DVB based systems also comprise metadata tables corresponding to the DVB SI EIT table or equivalent tables under ATSC or corresponding proprietary systems. When the user sets an event recording in the PVR, the recording start time and duration is typically determined by the PVR utilizing the EIT or EIT-equivalent table.

If for some reason the user wants to extend the recording beyond the recording time determined by the EIT start time and duration, the PVR platform must provide an option for the user to set such overtime. Similarly, if the user is not aware that overtime is needed, but nonetheless, overtime is needed, it is desirable for the PVR platform to automatically add such overtime. For example and without limiting the generality of the foregoing, if a football game is being automatically recorded as an event recording, and the football game goes into overtime, it is desirable for the PVR to automatically continue recording after the end of the event duration, as determined by the PVR based on the EIT or EIT-equivalent table.

In one embodiment of the present invention, the user is provided the option of setting a global parameter for the PVR platform which automatically adds default overtime to an event recording.

Referring specifically to FIGS. 1A and 1B, a PVR 180 is shown in FIGS. 1A and 1B displaying a message 190: "Recording Live". A television 200 shows a football game. In FIG. 1A, a clock 210a indicates that the football game has only 4 seconds remaining until the game goes into overtime; in a typical broadcast situation, this would correspond to 4 seconds remaining until the end of the event duration provided in the EIT or EIT-equivalent table.

FIG. 1B is depicted as occurring 21 seconds after the depiction in FIG. 1A. A clock 210b indicates that the football game has no time remaining until the game goes into overtime. An on-screen display (OSD) 220 indicates that the game is in overtime. A second clock, depicted as an overtime clock 230, indicates that the game is now 17 seconds in overtime.

Figure 3:
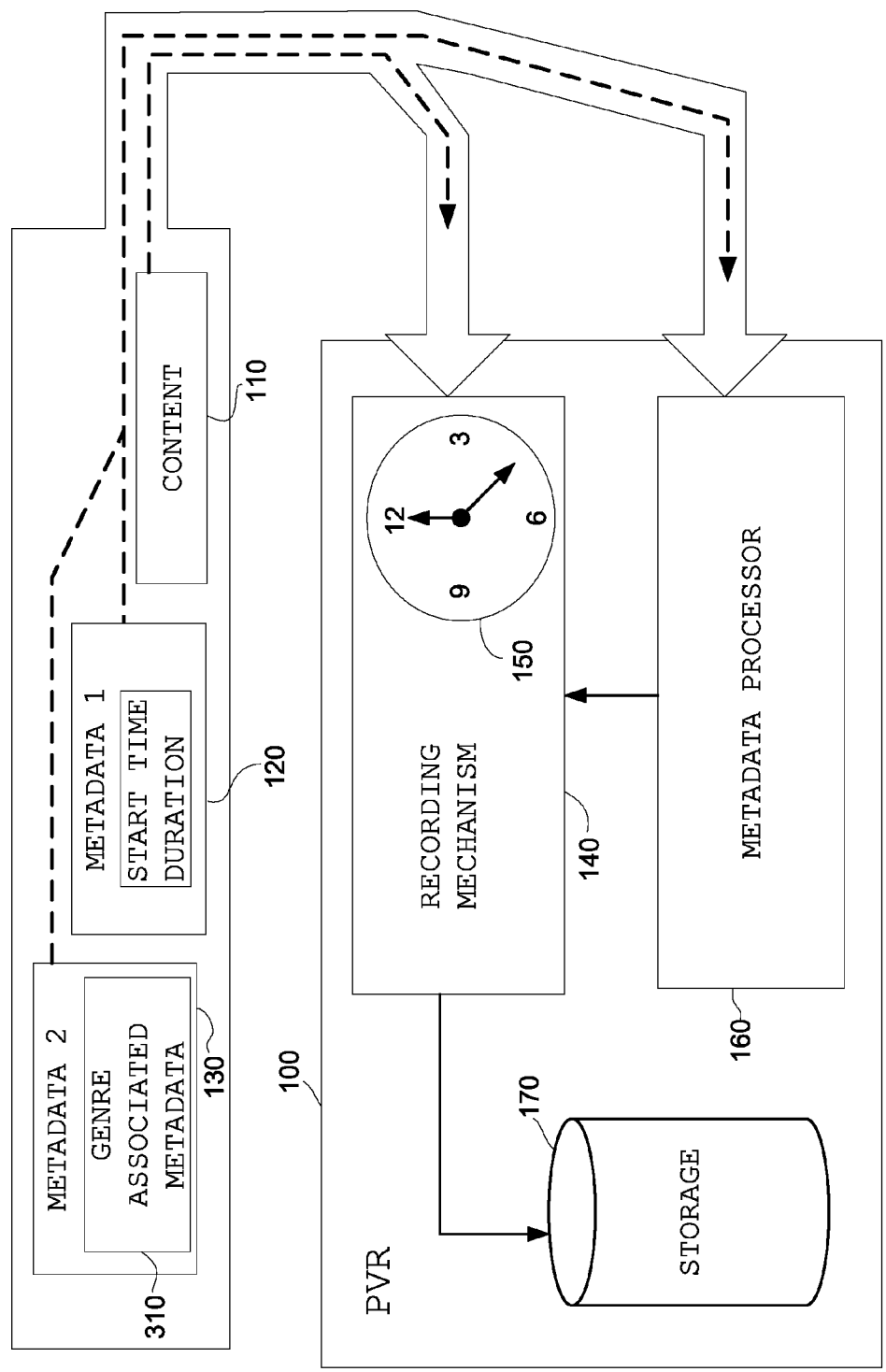
FIG. 3 is a simplified block diagram illustration of one embodiment of the system of FIG. 2.

Reference is now made to FIG. 3, which is a simplified block diagram illustration of one embodiment of the system of FIG. 2. In the embodiment of the present invention depicted in FIG. 3, the amount of overtime automatically added to the event recording is determined based on metadata comprised in the second metadata item 130. The second metadata item 130 comprises genre associated metadata 310. The genre associated metadata 310 is utilized as described below.

Reference is now made to Table 1. Table 1 is a description of DVB SI content_descriptor which is embedded in DVB SI EIT tables. The DVB SI content_descriptor is specified in ETSI EN 300 468, V1.5.1 (2003-05), page 36. The specification of EIT and all of its sub-components and tables in ETSI EN 300 468, V1.5.1 (2003-05), *Digital Video Broadcasting (DVB): Specification for Service Information (SI) in DVB systems*, is hereby incorporated herein by reference.

TABLE 1

Content_descriptor

| Syntax | Bit Size | Unit | Value/ Comment |
|---|---|---|---|
| content_descriptor( ){ | | | |
|   descriptor_tag | 8 | uimsbf | |
|   descriptor_length | 8 | uimsbf | |
|   for (i=0;i<N;i++) { | | | |
|     content_nibble_level_1 | 4 | uimsbf | |
|     content_nibble_level_2 | 4 | uimsbf | |
|     user_nibble | 4 | uimsbf | |
|     user_nibble | 4 | uimsbf | |
|   } | | | |
| } | | | |

The mnemonic "uimsbf" stands for: unsigned integer, most significant bit first.

In one embodiment of the present invention, a configurable amount of time is added to event recording time duration on the basis of genre/subgenre category. Generally the genre/subgenre of a given content item is always known, because genre/subgenre information is required for displaying the program category of a content item in a program guide, as is well known in the art.

The genre and subgenre values are specified in a standardized descriptor entitled content_descriptor and embedded in the EIT tables, see Table 1.

Specifically, ETSI EN 300 468, V1.5.1 proposes using the values of the content_nibble_level_1 and content_nibble_level_2 to map to specific genre and subgenre. Reference is now made to Appendix A, which comprises the table of Content_nibble_level_1 and Content_nibble_level_2 assignments provided in ETSI EN 300 468, V1.5.1. Reference is also made to Appendix B, which comprises an exemplary proprietary Content_nibble_level_1, Content_nibble_level_2, User_nibble_1, and User_nibble_2 assignment to genre and subgenre, as may be used by a typical broadcaster. Appendices A and B are provided as examples of methods a broadcaster may use to divide content into genre and subgenre.

On the basis of at least the genre and subgenre assignment, the PVR 100 automatically continues to record the content item for a default amount of overtime. Accordingly, when the PVR 100 is programmed to record events corresponding to a certain genre and subgenre, the PVR 100 automatically adds the default overtime to the recording value, regardless of any content item duration defined in a content item associated EIT or EIT-equivalent table.

Reference is now made to Table 2. Table 2 is an example of default overtimes associated with the exemplary proprietary Content_nibble_level_1, Content_nibble_level_2, User_nibble_1, and User_nibble_2 assignment to genre and subgenre presented in Appendix B, with an additional column added showing exemplary amounts of overtime to be added to an event recording for any content item associated with one of the genres or subgenres mentioned in Table 2.

TABLE 2

| CONTENT_NIBBLE_LEVEL_1 | CONTENT_NIBBLE_LEVEL_2 | USER_NIBBLE_1 | USER_NIBBLE_2 | TITTLE ON SCREEN | OVERTIME |
|---|---|---|---|---|---|
| 0x1 | 0xF | 0x2 | 0x0 | MOVIE | 5 min. |
| 0x4 | 0xF | 0x4 | 0x5 | CYCLING | 10 min. |
| 0x4 | 0xF | 0x4 | 0x7 | FOOTBALL | 35 min. |
| 0x6 | 0xF | 0x9 | 0x8 | MUSIC | 15 min. |
| 0xA | 0xF | 0xA | 0x7 | MOTORS | 2 min. |

Those skilled in the art will appreciate that at least two alternative methods for implementing the above-described embodiment of the invention exist. In a first one of the at least two alternative methods of implementation, the end user is able to program the PVR 100 to select an amount of overtime to be added for each genre and subgenre. In a second of the at least two alternative methods of implementation, the broadcaster determines the amount of overtime to be added for each genre and subgenre. The broadcaster can broadcast the amount of time in a private data descriptor, for example and without limiting the generality of the foregoing, in private data descriptor added to the EIT or the EIT-like table.

Figure 4:
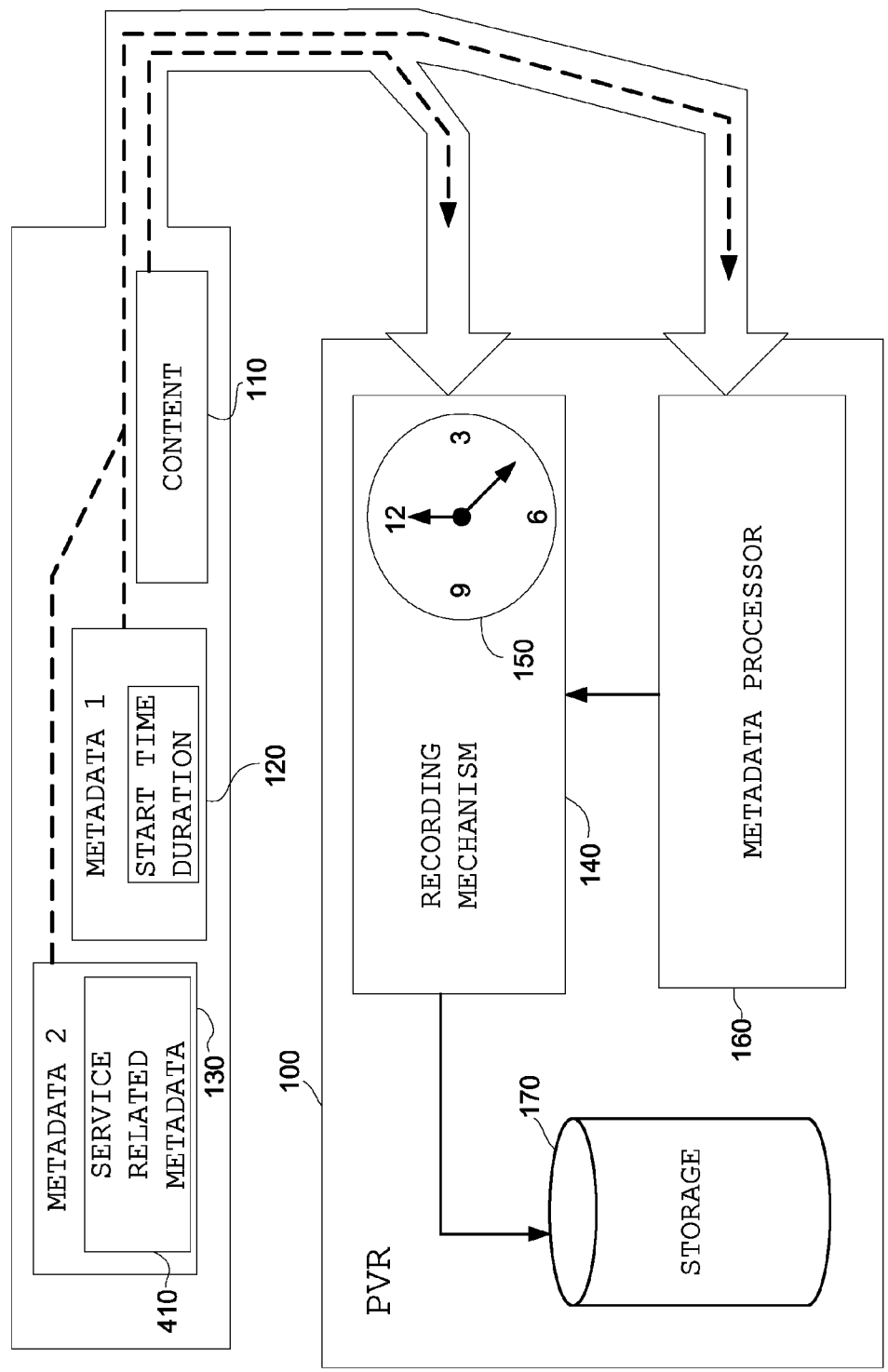
FIG. 4 is a simplified block diagram illustration of an alternative embodiment of the system of FIG. 2.

Reference is now made to FIG. 4, which is a simplified block diagram illustration of an alternative embodiment of the system of FIG. 2. In the embodiment of the present invention depicted in FIG. 4, the amount of overtime automatically added to the event recording is determined based on metadata comprised in the second metadata item 130. The second metadata item 130 comprises service associated metadata 410. The service associated metadata 410 is utilized as described below.

As is known in the art, a DVB service (or other appropriate analogous standards) comprises a sequence of events. Conventionally, a DVB service is typically known as a television channel. The DVB specification ETSI EN 300 468, V.1.5.1, referred to previously, specifies service information (SI). The DVB SI comprises a Service Description Table (SDT). The SDT comprises a unique service_identifier, the service_id field. Thus, each television channel, or broadcast service is associated with a unique service_id field. In the presently described embodiment of the present invention, the end user is able to configure the PVR 100 such that any content item recorded on a particular service is to receive, by virtue of being broadcast on the particular service, the configured amount of overtime.

It is appreciated that, although not specifically described herein, appropriate configuration screens are provided with the PVR 100 software, in order to enable practice of the present invention, as described herein.

Figure 5:
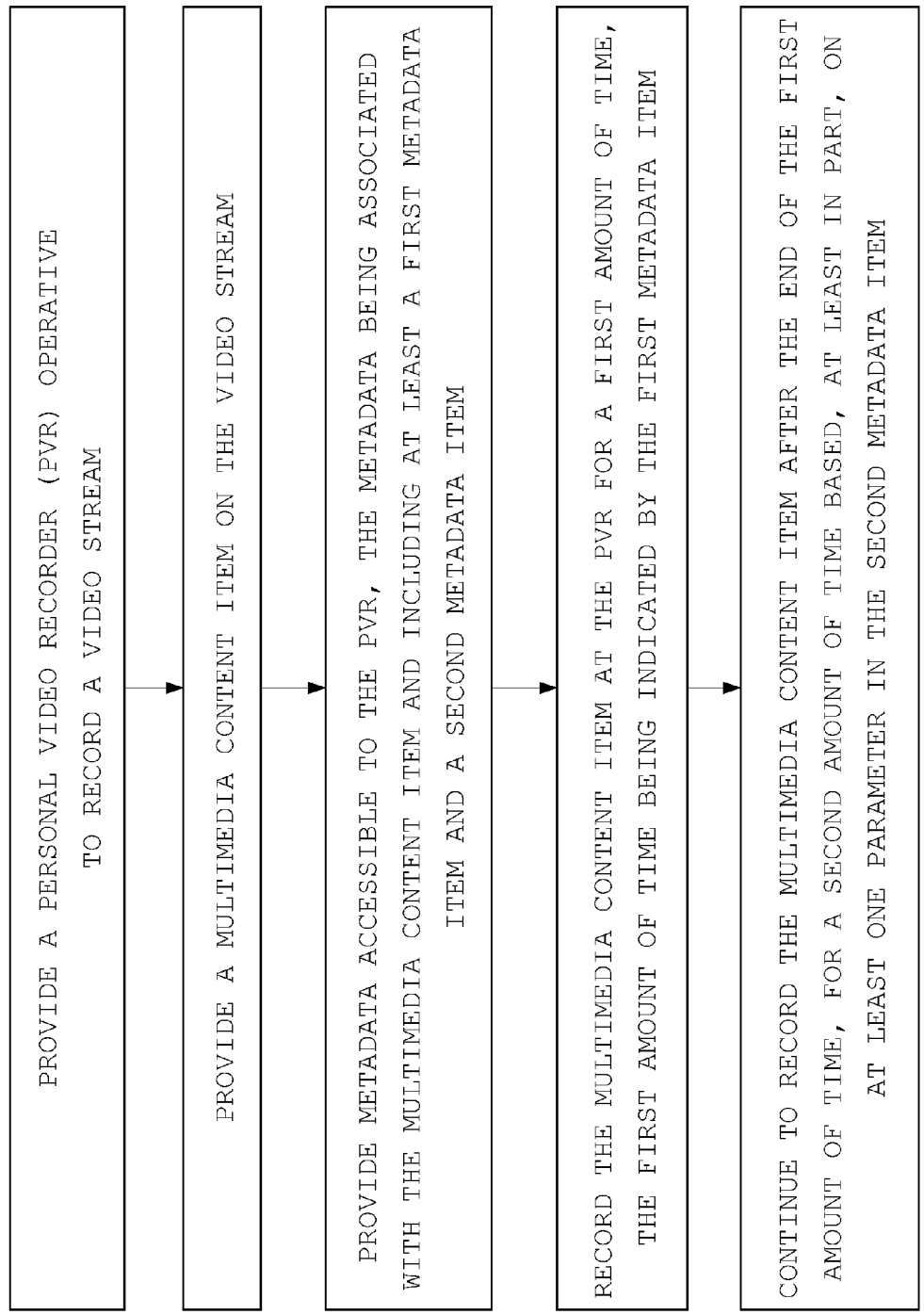
FIG. 5 is a simplified flowchart of a method of operation of the system of FIG. 1.

Reference is now made to FIG. 5, which is a simplified flowchart of a method of operation of the system of FIG. 1. FIG. 5 is believed to be self-explanatory in light of the above discussion.

It is appreciated that software components of the present invention may, if desired, be implemented in ROM (read only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

APPENDIX A

The following table is the DVB SI Content_nibble_level_1 and Content_nibble_level_2 assignments provided in ETSI EN 300 468, V1.5.1.

| Content_nibble_level_1 | Content_nibble_level_2 | Description |
|---|---|---|
| 0x0 | 0x0 to 0xF | undefined content |
| | | Movie/Drama: |
| 0x1 | 0x0 | movie/drama (general) |
| 0x1 | 0x1 | detective/thriller |
| 0x1 | 0x2 | adventure/western/war |
| 0x1 | 0x3 | science fiction/fantasy/horror |
| 0x1 | 0x4 | comedy |
| 0x1 | 0x5 | soap/melodrama/folkloric |
| 0x1 | 0x6 | romance |
| 0x1 | 0x7 | serious/classical/movie/religious/historical drama |
| 0x1 | 0x8 | adult movie/drama |
| 0x1 | 0x9 to 0xE | reserved for future use |
| 0x1 | 0xF | user defined |
| | | News/Current affairs: |
| 0x2 | 0x0 | news/current affairs (general) |
| 0x2 | 0x1 | news/weather report |
| 0x2 | 0x2 | news magazine |
| 0x2 | 0x3 | documentary |
| 0x2 | 0x4 | discussion/interview/debate |

-continued

| Content_nibble_level_1 | Content_nibble_level_2 | Description |
| --- | --- | --- |
| 0x2 | 0x5 to 0xE | reserved for future use |
| 0x2 | 0xF | user defined |
| | | Show/Game show: |
| 0x3 | 0x0 | show/game show (general) |
| 0x3 | 0x1 | game show/quiz/contest |
| 0x3 | 0x2 | variety show |
| 0x3 | 0x3 | talk show |
| 0x3 | 0x4 to 0xE | reserved for future use |
| 0x3 | 0xF | user defined |
| | | Sports: |
| 0x4 | 0x0 | sports (general) |
| 0x4 | 0x1 | events (Olympic special Games, World Cup etc.) |
| 0x4 | 0x2 | sports magazines |
| 0x4 | 0x3 | football/soccer |
| 0x4 | 0x4 | tennis/squash |
| 0x4 | 0x5 | team sports (excluding football) |
| 0x4 | 0x6 | athletics |
| 0x4 | 0x7 | motor sport |
| 0x4 | 0x8 | water sport |
| 0x4 | 0x9 | winter sports |
| 0x4 | 0xA | equestrian |
| 0x4 | 0xB | martial sports |
| 0x4 | 0xC to 0xE | reserved for future use |
| 0x4 | 0xF | user defined |
| | | Children's/Youth programmes: |
| 0x5 | 0x0 | children's/youth programmes (general) |
| 0x5 | 0x1 | pre-school children's programmes |
| 0x5 | 0x2 | entertainment programmes for 6 to 14 |
| 0x5 | 0x3 | entertainment programmes for 10 to 16 |
| 0x5 | 0x4 | informational/educational/school programmes |
| 0x5 | 0x5 | cartoons/puppets |
| 0x5 | 0x6 to 0xE | reserved for future use |
| 0x5 | 0xF | user defined |
| | | Music/Ballet/Dance: |
| 0x6 | 0x0 | music/ballet/dance (general) |
| 0x6 | 0x1 | rock/pop |
| 0x6 | 0x2 | serious music/classical music |
| 0x6 | 0x3 | folk/traditional music |
| 0x6 | 0x4 | jazz |
| 0x6 | 0x5 | musical/opera |
| 0x6 | 0x6 | ballet |
| 0x6 | 0x7 to 0xE | reserved for future use |
| 0x6 | 0xF | user defined |
| | | Arts/Culture (without music): |
| 0x7 | 0x0 | arts/culture (without music, general) |
| 0x7 | 0x1 | performing arts |
| 0x7 | 0x2 | fine arts |
| 0x7 | 0x3 | religion |
| 0x7 | 0x4 | popular culture/traditional arts |
| 0x7 | 0x5 | literature |
| 0x7 | 0x6 | film/cinema |
| 0x7 | 0x7 | experimental film/video |
| 0x7 | 0x8 | broadcasting/press |
| 0x7 | 0x9 | new media |
| 0x7 | 0xA | arts/culture magazines |
| 0x7 | 0xB | fashion |
| 0x7 | 0xC to 0xE | reserved for future use |
| 0x7 | 0xF | user defined |
| | | Social/Political issues/Economics: |
| 0x8 | 0x0 | issues/social/political economics (general) |
| 0x8 | 0x1 | magazines/reports/documentary |

-continued

| Content_nibble_level_1 | Content_nibble_level_2 | Description |
| --- | --- | --- |
| 0x8 | 0x2 | economics/social advisory |
| 0x8 | 0x3 | remarkable people |
| 0x8 | 0x4 to 0xE | reserved for future use |
| 0x8 | 0xF | user defined |
| | | Children's/Youth programmes: Education/Science/Factual topics: |
| 0x9 | 0x0 | education/science/topics factual (general) |
| 0x9 | 0x1 | nature/animals/environment |
| 0x9 | 0x2 | technology/natural sciences |
| 0x9 | 0x3 | medicine/physiology/psychology |
| 0x9 | 0x4 | foreign countries/expeditions |
| 0x9 | 0x5 | social/spiritual sciences |
| 0x9 | 0x6 | further education |
| 0x9 | 0x7 | languages |
| 0x9 | 0x8 to 0xE | reserved for future use |
| 0x9 | 0xF | user defined |
| | | Leisure hobbies: |
| 0xA | 0x0 | leisure hobbies (general) |
| 0xA | 0x1 | tourism/travel |
| 0xA | 0x2 | handicraft |
| 0xA | 0x3 | motoring |
| 0xA | 0x4 | fitness & health |
| 0xA | 0x5 | cooking |
| 0xA | 0x6 | advertisement/shopping |
| 0xA | 0x7 | gardening |
| 0xA | 0x8 to 0xE | reserved for future use |
| 0xA | 0xF | user defined |
| 0xB | 0x0 | original language |
| 0xB | 0x1 | black & white |
| 0xB | 0x2 | unpublished |
| 0xB | 0x3 | live broadcast |
| 0xB | 0x4 to 0xE | reserved for future use |
| 0xB | 0xF | user defined |
| 0xC to 0xE | 0x0 to 0xF | reserved for future use |
| 0xF | 0x0 to 0xF | user defined |

APPENDIX B

The following table is an exemplary proprietary Content_nibble_level_1 and Content_nibble_level_2 and User_nibbles assignment to genre and subgenre, as may be used by a typical broadcaster.

| CONTENT_NIBBLE_LEVEL_1 | CONTENT_NIBBLE_LEVEL_2 | USER_NIBBLE_1 | USER_NIBBLE_2 | GENRE AND/OR SUBGENRE |
| --- | --- | --- | --- | --- |
| 0x1 | 0xF | 0x2 | 0x0 | MOVIE |
| 0x4 | 0xF | 0x4 | 0x5 | CYCLING |
| 0x4 | 0xF | 0x4 | 0x7 | FOOTBALL |
| 0x6 | 0xF | 0x9 | 0x8 | MUSIC |
| 0xA | 0xF | 0xA | 0x7 | MOTORS |

What is claimed is:

1. A method for adding overtime to a video recording, the method comprising:

providing a personal video recorder (PVR) operative to record a video stream;

providing a multimedia content item on the video stream;

providing metadata accessible to the PVR, the metadata being associated with the multimedia content item and including at least a first metadata item and a second metadata item, the first metadata item comprising a starting time and a duration associated with the multimedia content item and the second metadata item comprising genre metadata associated with the multimedia content item;

recording the multimedia content item at the PVR for a first amount of time, the first amount of time being indicated by the first metadata item;

automatically continuing to record the multimedia content item being recorded after the first amount of time, for a second amount of time based, at least in part, on the genre metadata associated with the multimedia content item being recorded.

2. The method according to claim 1, and wherein at least one of the first metadata item and the second metadata item comprise DVB service information (SI) metadata.

3. The method according to claim 2, and wherein at least one of the first metadata item and the second metadata item comprise an EIT table of the DVB SI metadata.

4. The method according to claim 3 and wherein the genre metadata is determined by a combination of:

content_nibble_level_1
content_nibble_level_2; and
at least one user_nibble.

5. The method according to claim 1, and wherein at least one of the first metadata item and the second metadata item comprise a table comprised in a proprietary service information scheme.

6. The method according to claim 5 and wherein the table comprises a service information table from one of: XSI and XSI-2.

7. The method according to claim 6 and wherein the service information table comprises genre metadata information.

8. The method according to claim 1 and wherein the multimedia content item comprises at least one video component.

9. The method according to claim 1 and wherein the multimedia content item comprises at least one audio component.

10. The method according to claim 1 and wherein the multimedia content item comprises at least one subtitle component.

11. A system for adding overtime to a video recording, the system comprising:
a personal video recorder (PVR) operative to record a video stream, the video stream comprising a multimedia content item; and the PVR being further operative to access metadata, the metadata being associated with the multimedia content item and including at least a first metadata item and a second metadata item, the first metadata item comprising a starting time and a duration associated with the multimedia content item and the second metadata item comprising genre metadata associated with the multimedia content item; and
a content recorder operative to record the multimedia content item at the PVR for a first amount of time, the first amount of time being indicated by the first metadata item; and the content recorder being further operative to automatically continue to record the multimedia content item being recorded after the first amount of time, for a second amount of time based, at least in part, on the genre metadata associated with the multimedia content item being recorded.

12. A system for adding overtime to a video recording, the system comprising:
means for providing a personal video recorder (PVR) operative to record a video stream;
means for providing a multimedia content item on the video stream;
means for providing metadata accessible to the PVR, the metadata being associated with the multimedia content item and including at least a first metadata item and a second metadata item, the first metadata item comprising a starting time and a duration associated with the multimedia content item and the second metadata item comprising genre metadata associated with the multimedia content item;
means for recording the multimedia content item at the PVR for a first amount of time, the first amount of time being indicated by the first metadata item;
means for automatically continuing to record the multimedia content item being recorded after the first amount of time, for a second amount of time based, at least in part, on the genre metadata associated with the multimedia content item being recorded.

* * * * *

UNITED STATES PATENT AND TRADEMARK OFFICE
CERTIFICATE OF CORRECTION

| | | |
|---|---|---|
| PATENT NO. | : 8,594,490 B2 | Page 1 of 1 |
| APPLICATION NO. | : 12/735335 | |
| DATED | : November 26, 2013 | |
| INVENTOR(S) | : Arques et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 423 days.

Signed and Sealed this
Twenty-fourth Day of February, 2015

Michelle K. Lee
*Deputy Director of the United States Patent and Trademark Office*

UNITED STATES PATENT AND TRADEMARK OFFICE
CERTIFICATE OF CORRECTION

| | | | |
|---|---|---|---|
| PATENT NO. | : | 8,594,490 B2 | Page 1 of 1 |
| APPLICATION NO. | : | 12/735335 | |
| DATED | : | November 26, 2013 | |
| INVENTOR(S) | : | Arques et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 389 days.

Signed and Sealed this
Twenty-second Day of September, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 8,594,490 B2 | Page 1 of 1 |
| APPLICATION NO. | : 12/735335 | |
| DATED | : November 26, 2013 | |
| INVENTOR(S) | : Arques et al. | |

It is certified that error appears in the above-identified patent and that said Letters Patent is hereby corrected as shown below:

The certificate of correction issued September 22, 2015 displaying the correction:
"On the Title Page, The first or sole Notice should read:
Subject to any disclaimer, the term of this patent is extended or adjusted under 35 U.S.C. 154(b) by 389 days." was issued in error and is vacated. The correct patent term is extended or adjusted "by 423 days".

The [*] Notice should read:

On the Title Page:

The first or sole Notice should read --

Subject to any disclaimer, the term of this patent is extended or adjusted under 35 U.S.C. 154(b) by 423 days.

Signed and Sealed this
Twenty-seventh Day of October, 2015

Michelle K. Lee
*Director of the United States Patent and Trademark Office*